(12) United States Patent
Hessenberger et al.

(10) Patent No.: US 6,847,146 B2
(45) Date of Patent: Jan. 25, 2005

(54) FIELD ASSEMBLY AND METHODS FOR ASSEMBLING A FIELD ASSEMBLY

(75) Inventors: Jeffrey C. Hessenberger, Neosho, WI (US); David H. Cummings, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 347 days.

(21) Appl. No.: 09/911,188

(22) Filed: Jul. 23, 2001

(65) Prior Publication Data

US 2002/0047444 A1 Apr. 25, 2002

Related U.S. Application Data

(60) Provisional application No. 60/221,467, filed on Jul. 26, 2000.

(51) Int. Cl.[7] .............................. H02K 1/00; H02K 3/00; H02K 19/26; H02K 21/00; H02K 23/40
(52) U.S. Cl. ........................ 310/179; 310/180; 310/184; 310/194
(58) Field of Search ........................... 310/179, 71, 180, 310/184, 194, 183, 259, 189, 208, 214, 132; 29/596, 775

(56) References Cited

U.S. PATENT DOCUMENTS

| | | | | |
|---|---|---|---|---|
| 3,575,623 A | * | 4/1971 | Stine ........................... 310/260 |
| 3,974,407 A | | 8/1976 | Dochterman | |
| 4,074,418 A | * | 2/1978 | Pearsall ........................ 29/596 |
| 4,287,446 A | * | 9/1981 | Lill et al. ...................... 210/71 |
| 4,335,325 A | * | 6/1982 | Miller et al. ................. 310/214 |
| 4,340,829 A | * | 7/1982 | McCoy ......................... 310/71 |
| 4,361,773 A | | 11/1982 | Mokrzycki | |
| 4,481,435 A | * | 11/1984 | Loforese ....................... 310/71 |
| 4,507,580 A | * | 3/1985 | Obara ......................... 310/214 |
| 4,982,124 A | | 1/1991 | Cummings et al. | |
| 5,229,674 A | * | 7/1993 | Best ............................. 310/71 |
| 5,331,240 A | * | 7/1994 | Hyodo ......................... 310/71 |
| 5,341,997 A | * | 8/1994 | Luciani .................... 242/432.4 |
| 5,361,487 A | * | 11/1994 | Luciani et al. ................ 29/596 |
| 5,392,506 A | * | 2/1995 | Luciani et al. ................ 29/596 |
| 5,394,046 A | * | 2/1995 | Dolgas ....................... 310/254 |
| 5,535,503 A | * | 7/1996 | Newman ....................... 29/596 |
| 6,031,307 A | * | 2/2000 | Ohshita ........................ 310/71 |
| 6,034,461 A | * | 3/2000 | Sun ............................. 310/218 |
| 6,092,276 A | * | 7/2000 | Beakes et al. ................. 29/596 |
| 6,201,322 B1 | * | 3/2001 | Heine et al. ................... 310/51 |

* cited by examiner

Primary Examiner—Burton S. Mullins
Assistant Examiner—Julio Gonzalez
(74) Attorney, Agent, or Firm—Michael Best & Friedrich LLP

(57) ABSTRACT

The present invention provides a field assembly for an electric motor and methods for assembling the field assembly. The field assembly includes a winding support and wire redirection structure. The field assembly may be used to manufacture motor assemblies having different polarities (both standard wound and reverse wound) for use with common motor housings, brushes, and wiring.

16 Claims, 5 Drawing Sheets

FIELD ASSEMBLY AND METHODS FOR ASSEMBLING A FIELD ASSEMBLY

This application claims the benefit of provisional application No. 60/221,467 filed Jul. 26, 2000.

FIELD OF THE INVENTION

The invention relates to electric motors and, more particularly, to methods for assembling a field assembly of an electric motor.

BACKGROUND OF THE INVENTION

Alternating current (a.c.) universal motors are commonly used in electrical power tools, such as, for example, circular saws, reciprocating saws and drills, and other types of equipment. Generally, these motors are a high-power, lightweight drive source for electric tools.

Typically, a universal motor includes a field or stator assembly and a rotatable arbor or shaft having an armature mounted thereon. Current flowing through a run coil of the stator assembly creates a magnetic field that interacts with the armature to rotatably drive the arbor in a direction of rotation. A tool element, such as a saw blade or drill bit, is coupled to the arbor and driven by the motor.

A typical field assembly includes an insulated field core having a winding support and a wire or winding wound on the core and the winding support. The field assembly may also include a terminal assembly to which the ends or leads of the winding are terminated for easy connection with other components of the motor.

SUMMARY OF THE INVENTION

The direction of rotation of the arbor is determined by, among other things, the polarity of the magnetic field of the motor. Generally, there are two types of winding arrangements for the coil windings of a field assembly. In a standard wound field assembly, connection of the field assembly to a power source provides a first polarity for the motor, and a resulting first direction of rotation of the arbor. In a reverse wound field assembly, connection of the field assembly to the power source (i.e., in manner similar to that used for the standard wound field assembly) provides an opposite, second polarity for the motor, and a resulting opposite, second direction of rotation of the arbor.

To provide a standard wound field assembly, the winding is wound in a first direction (e.g., clockwise) on the winding support. The ends or leads of the winding are provided at one end of the core and on opposite sides of the winding support (to be connected to respective terminal assemblies and/or to other components of the motor).

To provide a reverse wound field assembly using a standard core and standard connections to the terminals and/or other components of the motor, the winding is wound in an opposite, second direction (e.g., counterclockwise) on the winding support. The ends or leads of the winding are provided at the same one end of the core for the reverse wound field assembly as they were for the standard wound field assembly, however, the ends of the winding are provided on reversed sides of the winding support (i.e., the polarity of the winding is reversed for the reverse wound field assembly when compared to the standard wound field assembly).

To connect the ends of the winding to the proper terminal assemblies for the reverse wound field assembly, the ends of the winding must cross over the winding support at the one end of the core immediately before or immediately after being connected to the respective terminal assemblies. This crossing of the ends of the winding over the winding support is difficult to accomplish using standard winding machinery. Also, in such an orientation, the connections between the terminal assemblies and the ends of the winding are not as stable (i.e., the ends of the winding connect loosely from the side of the terminal assemblies rather than being stretched tightly between the bottom of the winding support and the bottom of the terminal assemblies as is the case for a standard wound field assembly).

The present invention provides a field assembly and methods for assembling a field assembly that improves on prior field assemblies and prior methods of winding the field assemblies. The present invention provides a field assembly and a method of winding a field assembly in which, in the reverse wound field assembly, the ends of the winding do not cross over the winding support to connect to the respective terminals in a standard connection.

More particularly, the invention provides a field assembly for a motor, such as a universal motor, the field assembly including an insulated field core having a winding support, a wire redirection structure, and a winding, such as a run coil. To provide a field assembly having a first polarity, the winding is wound on the winding support in a first direction (e.g., clockwise). When the winding is connected to a power supply, the arbor rotates in a first direction.

To provide a field assembly having a second polarity, the winding is wound on the winding support in an opposite, second direction (e.g., counterclockwise). To wind the winding in the second direction, the winding is wound on the wire redirection structure and on the winding support. When the winding is connected to a power supply (i.e., in manner similar to that used for the field assembly having a first polarity), the arbor rotates in an opposite, second direction.

Also, the field assembly may include a first terminal assembly and a second terminal assembly to which the ends or leads of the winding are connected. The terminal assemblies provide a structure for easily connecting the field assembly to the other components of the motor. The wire redirection structure preferably includes a first wire redirection structure or post and a second wire redirection structure or post. To wind the winding in the second direction, the winding is wound from the first terminal assembly in the first direction, around the first post (to reverse or redirect the direction of winding) and around the winding support in the second direction. At the end of the winding process, the winding is wound around the second post (to again redirect the direction of winding) and to the second terminal assembly in the first direction. As a result, the ends of the winding do not cross over the winding support immediately before or immediately after being connected to their respective terminal assemblies.

Preferably, the terminal assemblies and the wire redirection structure are supported on a terminal plate mounted on one end of the core. The terminal plate is preferably formed of an insulating material.

The field assembly may include a second winding, such as a second run coil or a dynamic brake coil, to be wound on the winding support. The second winding is wound on the winding support structure in generally the same manner as the first winding, but in the manner required by the function of the second winding (as a run coil or as a brake coil).

One independent advantage of the present invention is that the field assembly may be used to manufacture motor assemblies having different polarities (both standard wound and reverse wound), and for use with common motor housings, brushes, and wiring.

Another independent advantage of the present invention is that, with the field assembly including a field core and wire redirection structure, manufacture of both the standard wound and the reverse wound field assembly to provide both types of motor is easier and more economical.

Other independent features and independent advantages of the invention will become apparent to those skilled in the art upon review of the following detailed description, claims, and drawings.

Figure 1:
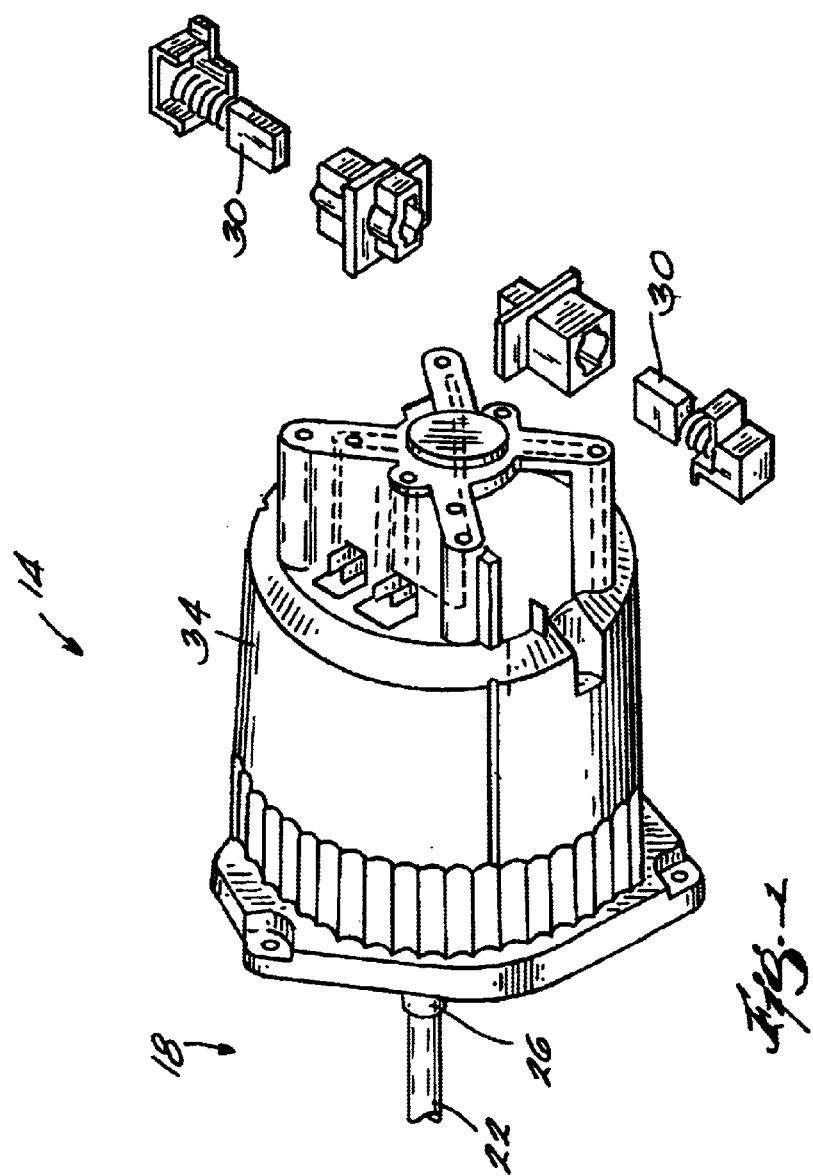
FIG. 1 is an exploded view of a portion of a power tool and an electric motor.
Figure 3:
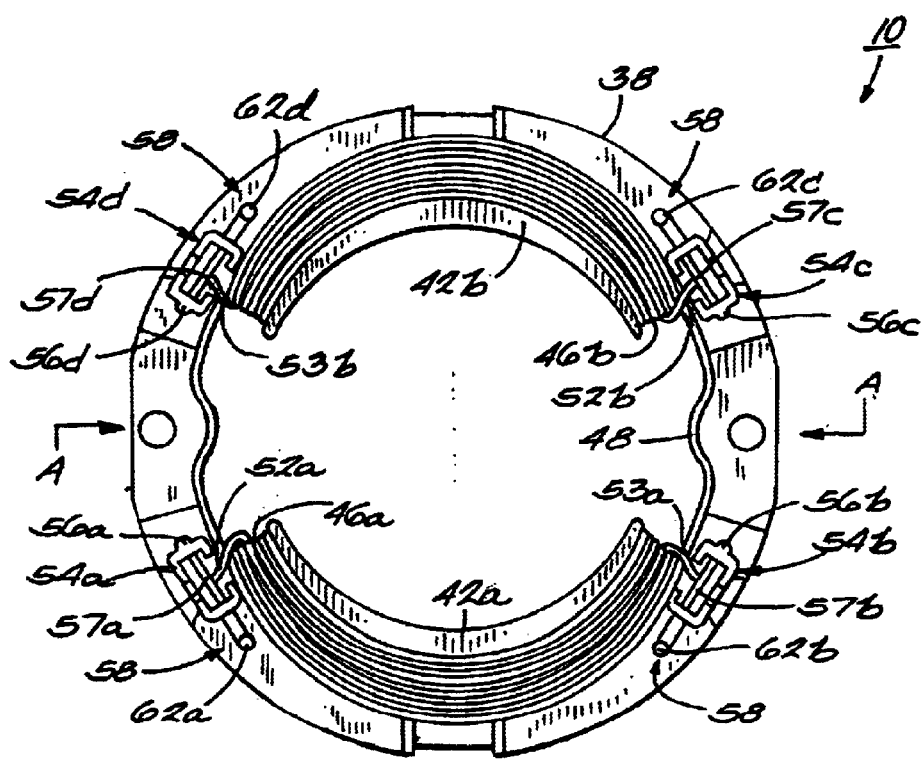
FIG. 3 is a top view of the field assembly shown in FIG. 2.
Figure 2:
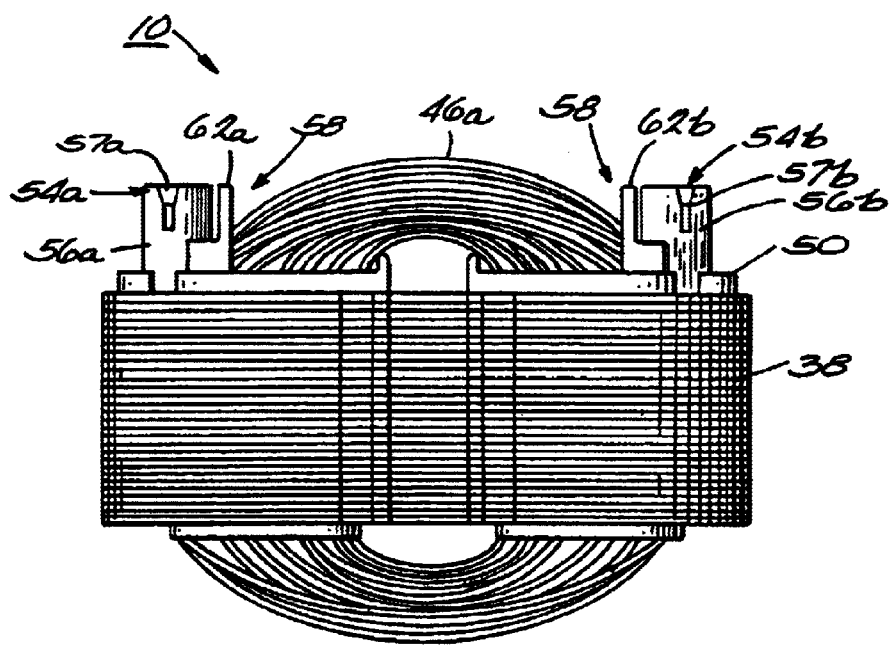
FIG. 2 is a side view of a field assembly.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

A field assembly 10 embodying the invention and for use in a power tool 14 is illustrated in FIG. 1. The field assembly 10 is a part of an electric motor 18 for the power tool 14. The electric motor 18 is connectable to a power source (not shown) to drive a tool element (not shown).

The electric motor 18 also includes a rotatable shaft or arbor 22 (schematically illustrated in FIG. 1) supporting an armature 26. A pair of brushes 30 transfer electricity to the rotating armature 26 to generate an armature field. The components of the motor 18 are supported by a motor housing 34. The components of the motor 18 are electrically connected to each other and are connectable to the power source by an electrical circuit.

As shown in more detail in FIGS. 2–7, the field assembly 10 includes a field core 38 having a wire or winding support structure 42a–b. One or more coil wires or windings 46a–b are wound on the core 38, as described below in more detail. Insulating material, such as insulation paper 48, is provided between the core 38 and the windings 46a–b.

An insulated terminal plate 50 is supported on one end of the core 38. Terminal assemblies 54a–d are supported on the terminal plate 50. In the illustrated construction, the ends or leads 52a–b and 53a–b of the windings 46a–b are connected to terminal assemblies 54a–d, as described below in more detail, for quick and easy connection of the field assembly 10 to the other components of the motor. The terminal assemblies 54a–d include respective terminal pockets 56a–d, which are formed of an insulating material and which, in the illustrated construction, are formed with the terminal plate 50, and respective terminal members 57a–d, which are insertable into the associated terminal pockets 56a–d. The terminal members 57a–d are electrically connected to the leads 52a–b and 53a–b of the windings 46a–b, as described below in more detail.

The field assembly 10 also includes a wire redirection structure 58 on which a portion of the winding 46a–b is selectively wound. Preferably, the wire redirection structure 58 is formed on the terminal plate 50 and includes a plurality of wire redirection posts 62a–d.

For purposes of description, the field assembly 10 will be described as being selectively wound in one of a first polarity (when connected to the power source) to rotate the arbor in a first rotational direction, and an opposite, second polarity (when connected to the power source in a similar manner) to rotate the arbor in an opposite, second rotational direction. It should be understood that this description is independent of the effects of a reversing mechanism, such as a reversible switch, on the electrical current and polarity of the motor. For example, if a standard wound field assembly rotates an arbor (and a tool element) in the first direction (e.g., clockwise) with the reversing mechanism in a "forward" position, a reverse wound field assembly will rotates the arbor (and the tool element) in the opposite, second direction (e.g., counterclockwise) with the reversing mechanism in the same "forward" position.

It should be understood that the terms "clockwise" and "counterclockwise" are used for the purpose of description. It should also be understood that the arrows indicating these directions on the windings 46a–b in FIGS. 4–7 are used for the purpose of description. These terms and the arrows may be reversed while adhering to the teachings of the present invention.

Figure 4:
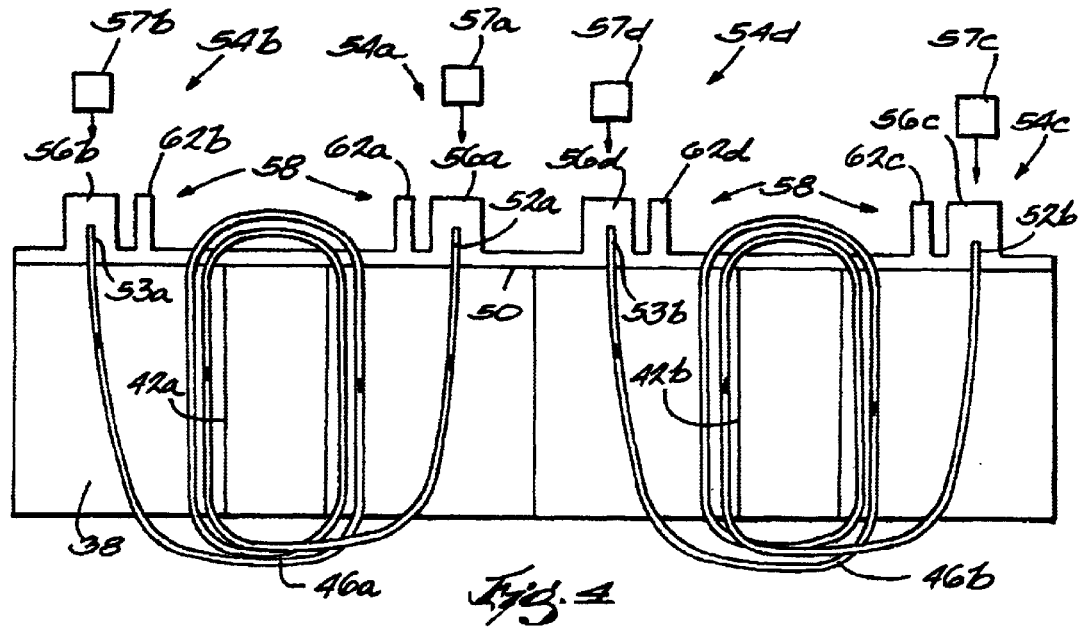
FIG. 4 is a view of the field assembly cut along line A—A in FIG. 3 and laid flat and illustrating a standard wound field assembly.

As shown in FIG. 4, to provide a standard wound split coil field assembly having a first polarity, the first end or start lead 52a of the winding 46a is connected to the terminal pocket 56a of the terminal assembly 54a, and the winding 46a is wound around the winding support structure 42a in a first direction (e.g., clockwise). The second end or finish lead 53a of the winding 46a is then connected to the terminal pocket 56b of the terminal assembly 54b. The terminal members 57a–b are inserted into the respective terminal pockets 56a–b and electrically connected with the respective leads 52a and 53a. To provide the first polarity, the winding 46a is not wound on the wire redirection structure 58.

If required by the design of the motor, the winding 46b is wound on the winding support structure 42b and between the terminal assemblies 54c and 54d in a similar manner. To provide the first polarity, the winding 46b is also not wound on the wire redirection structure 58.

Figure 5:
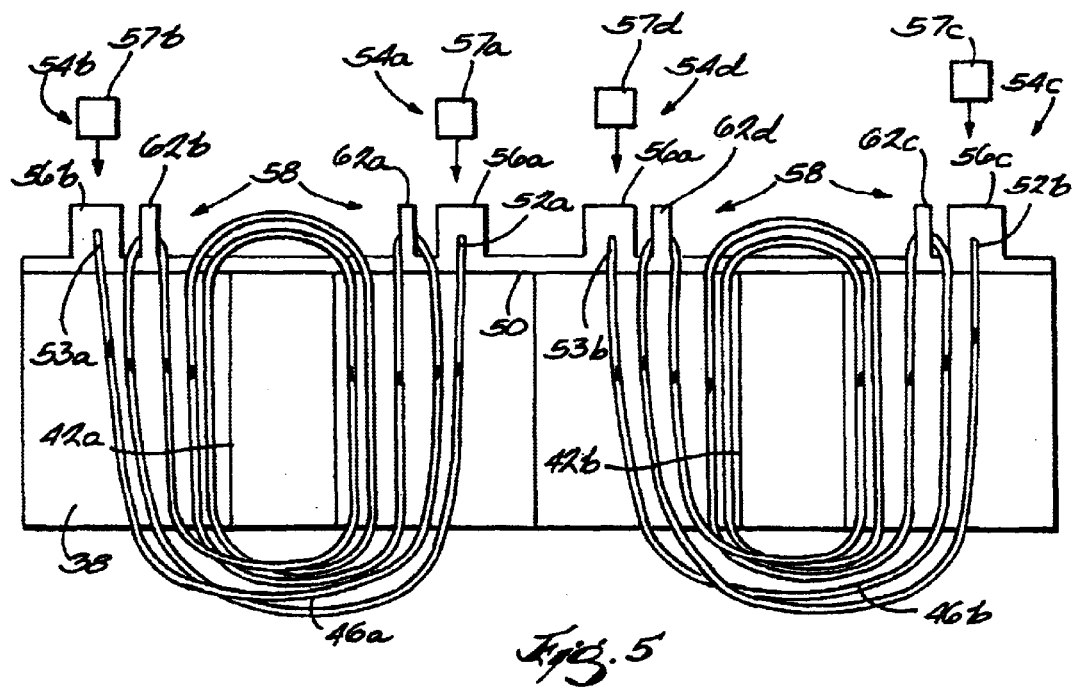
FIG. 5 is a view similar to that in FIG. 4 and illustrating a reverse wound field assembly.

As shown in FIG. 5, to provide a reverse wound split coil field assembly having an opposite, second polarity, the start lead 52a of the winding 46a is connected to the terminal pocket 56a of the terminal assembly 54a, and the winding 46a is wound in the first direction to and around the wire redirection post 62b to reverse or redirect the direction of the winding 46a. The winding 46a is then wound on the winding support structure 42a in the opposite, second direction (e.g., counterclockwise). Near the end of the winding process, the winding 46a is wound around the wire redirection post 62a to again reverse the direction of the winding 46a. The finish lead 53a of the winding 46a is then connected to the terminal pocket 56b of the terminal assembly 54b. The terminal members 57a–b are inserted into the respective terminal pockets 56a–b and electrically connected with the respective leads 52a and 53a. To provide the second polarity, the winding 46a is wound on the wire redirection structure 58.

If required by the design of the motor, the winding 46b is wound on the winding support structure 42b, the wire redirection structure 58, and between the terminal assemblies 54c and 54d in a similar manner. To provide the second polarity, the winding 46b is also wound on the wire redirection structure 58.

Figure 6:
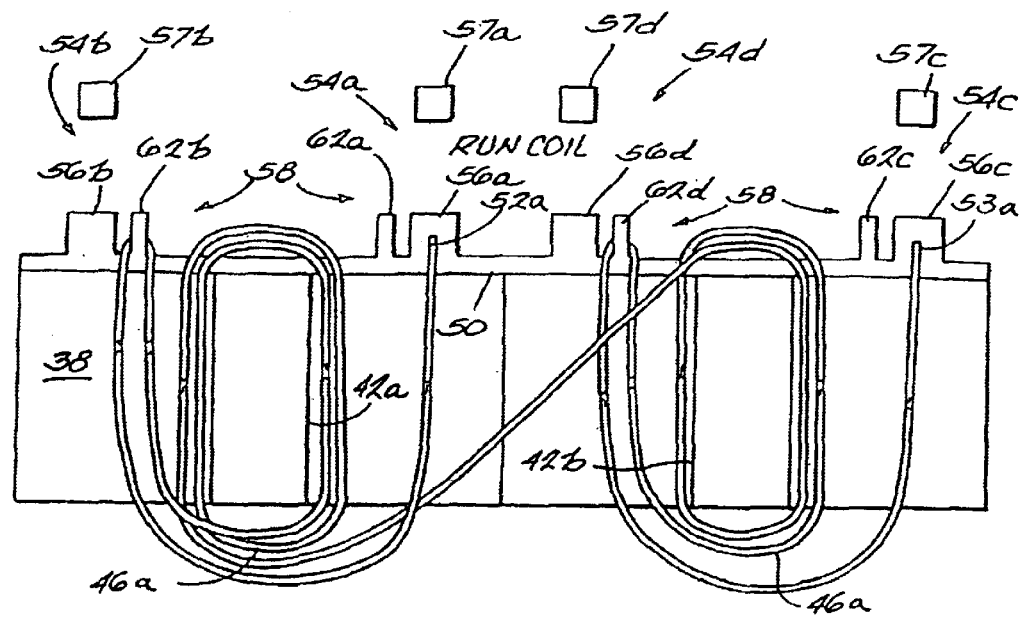
FIG. 6 is a view similar to that in FIG. 4 and illustrating a standard wound field assembly including a run coil and a brake coil.
Figure 6:
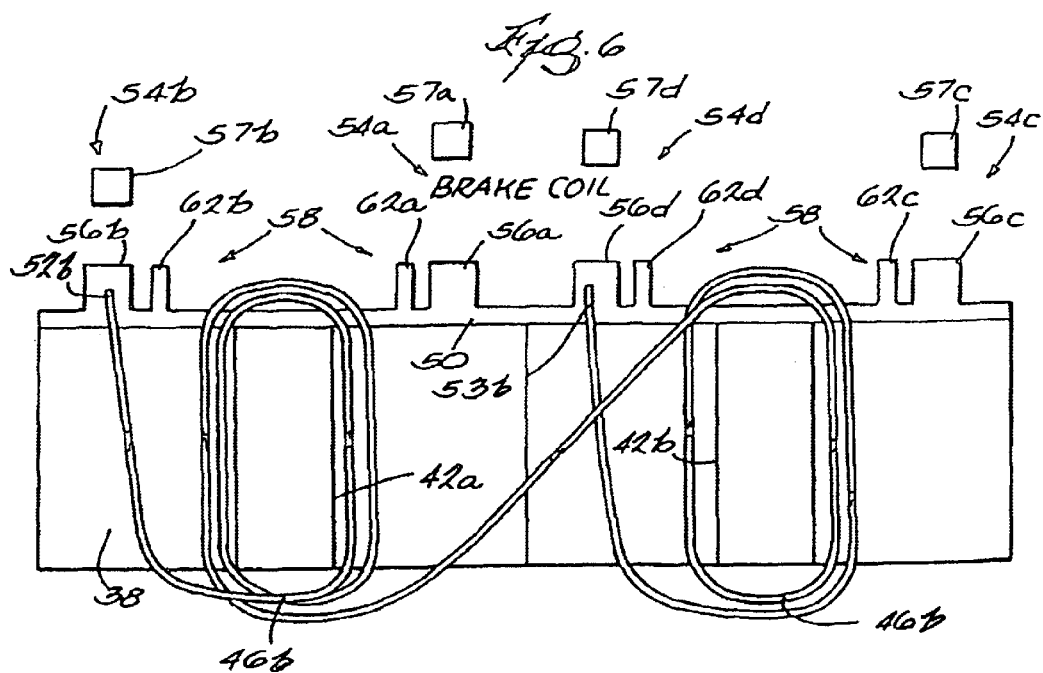

As shown in FIG. 6, to provide a standard wound field assembly having a first polarity and including a run winding 46a and a brake winding 46b, the start lead 52a of the run winding 46a is connected to the terminal pocket 56a of the terminal assembly 54a, and the run winding 46a is wound in the first direction to and around the wire redirection post 62b to reverse the direction of the run winding 46a. The run winding 46a is then wound on the winding support structure 42a in the second direction. The run winding 46a crosses over and is then wound to and on the winding support structure 42b in a first direction and to and around the wire redirection post 62d to again reverse the direction of the run winding 46a. Finally, the finish lead 53a of the run winding 46a is connected to the terminal pocket 56c of the terminal assembly 54c. The terminal members 57a and 57c are inserted into the respective terminal pockets 56a and 56c and electrically connected with the respective leads 52a and 53a.

The brake winding 46b is then wound on the same field core 38 as the run winding 42a (the run winding 42a and the brake winding 42b are schematically shown separately in FIG. 6 to illustrate the winding patterns). The start lead 52b of the brake winding 46b is connected to the terminal pocket 56b of the terminal assembly 54b and wound on the winding support structure 42a in the second direction. The brake winding 46b crosses over and is then wound to and on the winding support structure 42b in the first direction. Finally, the finish lead 53b of the brake winding 46b is connected to the terminal pocket 56d of the terminal assembly 54d. The terminal members 57b and 57d are inserted into the respective terminal pockets 56b and 56d and electrically connected with the respective leads 52b and 53b.

Figure 7:
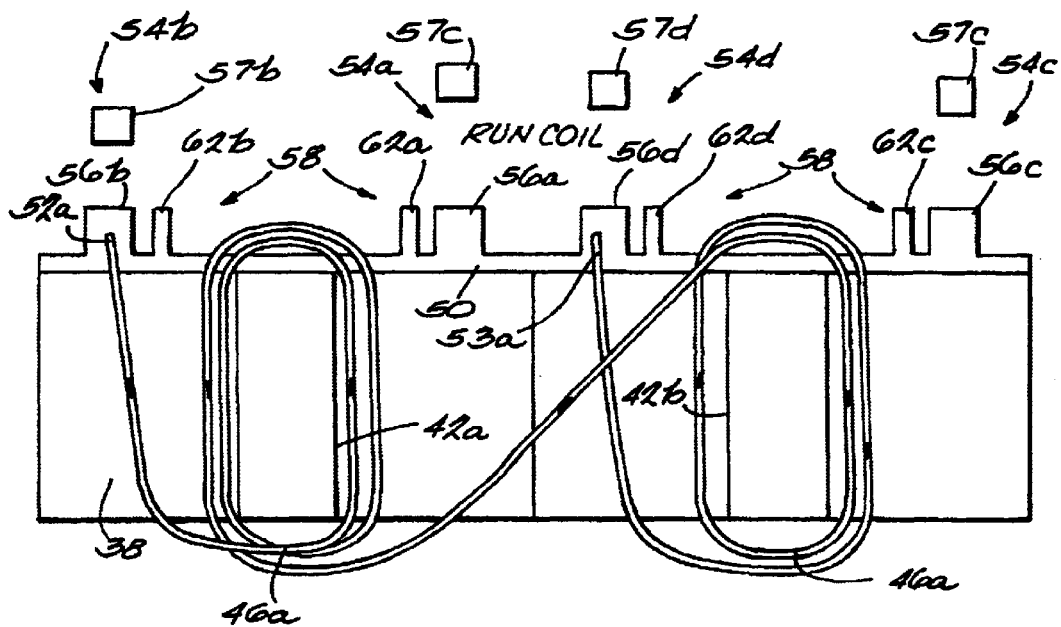
FIG. 7 is a view similar to that in FIG. 6 and illustrating a reverse wound field assembly including a run coil and a brake coil.
Figure 7:
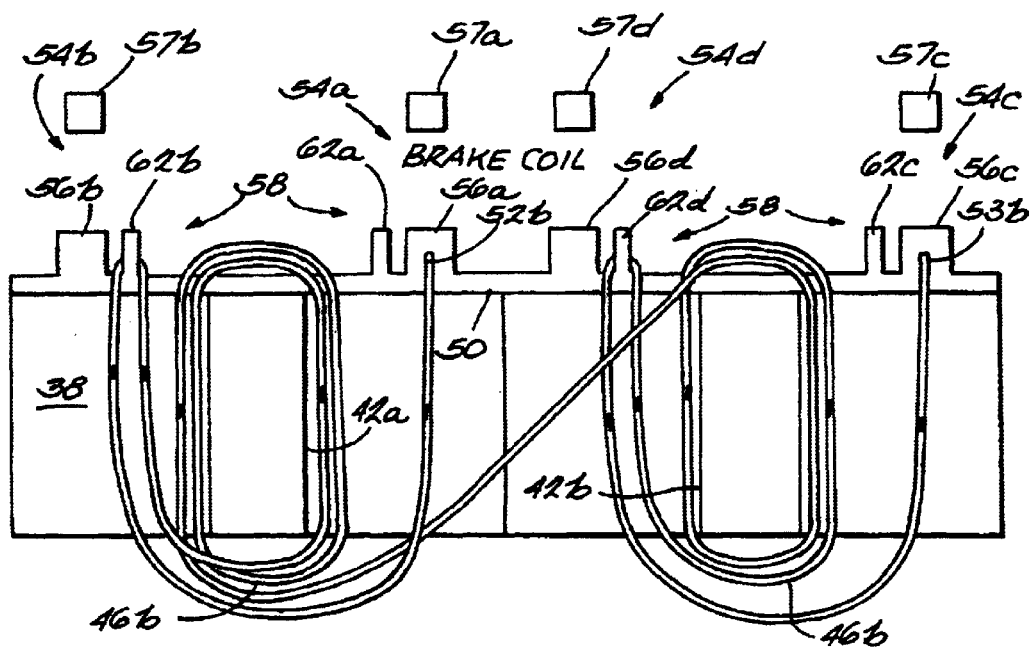

As shown in FIG. 7, to provide a reverse wound field assembly having a second polarity (opposite to the polarity provided by the winding arrangement shown in FIG. 6) and including a run winding 46a and a brake winding 46b, the start lead 52a of the run winding 46a is connected to the terminal pocket 56b of the terminal assembly 54b and wound on the winding support structure 42a in a second direction. The run winding 46a crosses over and is then wound to and on the winding support structure 42b in the first direction. Finally, the finish lead 53a of the run winding 46a is connected to the terminal pocket 56d of the terminal assembly 54d. The terminal members 57b and 57d are inserted into the respective terminal pockets 56b and 56d and electrically connected with the respective leads 52a and 53a.

The brake winding 46b is then wound on the same field core 38 as the run winding 42a (the run winding 42a and the brake winding 42b are schematically shown separately in FIG. 7 to illustrate the winding patterns). The start lead 52b of the brake winding 46b is connected to the terminal pocket 56a of the terminal assembly 54a and wound in the first direction to and around the wire redirection post 62b to reverse the direction of the brake winding 46b. The brake winding 46b is then wound on the winding support structure 42a in the second direction. The brake winding 46b crosses over and is then wound to and on the winding support structure 42b in the second direction and then around the wire redirection post 62d to again reverse the direction of the brake winding 46b. Finally, the finish lead 53b of the brake winding 46b is connected to the terminal pocket 56c of the terminal assembly 54c. The terminal members 57a and 57c are inserted into the respective terminal pockets 56a and 56c and electrically connected with the respective leads 52b and 53b.

In the winding arrangements illustrated in FIGS. 6 and 7, when the run winding 46a is connected to the power source, the arbor 22 will be rotated (in one direction with the polarity provided by the arrangement in FIG. 6 and in the opposite direction with the polarity provided by the arrangement in FIG. 7). When the dynamic brake is employed, the brake winding 46b will cause a counter-EMF force to be applied in a direction opposite to the run direction for the illustrated winding arrangement.

When winding a subsequent field assembly (not shown) including a run winding and a brake winding, the winding machine (not shown) may operate in a manner which is the reverse of that described above, and, in the preferred embodiment, the winding machine does so with the next field assembly (not shown). Specifically, for the next field assembly, the positions of the leads 52a and 53a of the run winding 46a and the leads 52b and 53b of the brake winding 46b are reversed, and the winding directions are reversed (in the direction opposite to the arrows in FIGS. 6–7). In other words, the machine starts winding on the next field core (not shown) in the position in which the machine finished winding on the last core 38. It should be understood that, however, in other constructions, the winding machine may not be operate in the reverse manner to wind subsequent field assemblies.

To assemble the power tool 14, the polarity of the field assembly 10 is selected, and the field assembly 10 is wound in one of the arrangements described above. The components of the motor 18 are supported in the housing 34 and electrically connected together. The remaining components of the power tool 14 are then assembled. To operate the power tool 14, the motor 18 is energized, and the arbor 22 rotates in the specified direction, driving the tool element.

It should be understood that, in other constructions (not shown), the wire redirection structure 58 may be supported separately from the terminal assemblies 54a–d and/or on the opposite end of the core 38. Also, the wire redirection posts 62a–d may have a different configuration, such as, for example, a loop or a groove in the terminal plate 50.

It should also be understood that, in other constructions (not shown), the ends of the winding 46a–b may be directly wired to other components of the motor 18 rather than being connected to the terminal assemblies 54a–d. Further, the motor 18 may have different and/or additional components than those components described above.

In addition, it should be understood that the field assembly 10 and the winding method of the present invention may be used in other types of motors including wound components similar to the field assembly 10 and for different types of electrical equipment.

With the field assembly 10, motor assemblies having different polarities (both standard wound and reverse wound) may be manufactured for use with common motor housings, brushes, and wiring. Also, the manufacture of both the standard wound and the reverse wound field assembly, to provide both types of motors, is easier and more economical. The field assembly 10 may be wound to provide either polarity motor by fairly standard winding machinery.

Various features of the invention are set forth in the following claims.

What is claimed is:

1. A field assembly for an electric motor, the field assembly comprising:
    a field core having a winding support structure;
    a wire redirection structure supported by the field core; and
    a winding selectively wound on the winding support structure in one of a first direction, to provide a first polarity, and a second direction, to provide a second polarity, the second polarity being different than the first polarity, wherein, to selectively wind the winding in the first direction, the winding is wound around the winding support structure and the wire redirection structure, and wherein, to selectively wind the winding in the second direction, the winding is wound around the winding support structure and not wound around the wire redirection structure.

2. A field assembly as claimed in claim 1, and further comprising a terminal plate connected to the field core.

3. A field assembly as claimed in claim 2, wherein the terminal plate is formed of an insulated material.

4. A field assembly as claimed in claim 1, wherein the wire redirection structure includes a first post and a second post, and wherein, to selectively wind the winding in the first direction, the winding is wound on the first post, the winding support structure, and the second post.

5. A field assembly as claimed in claim 4, wherein, to selectively wind the winding in the second direction, the winding is wound on the winding support structure and not wound on the first post and the second post.

6. A field assembly for an electric motor, the field assembly comprising:
    a field core having a winding support structure;
    a wire redirection structure supported by the field core; and
    a winding selectively wound on the winding support structure in of a first direction, to provide a first polarity, and a second direction, to provide a second polarity, the second polarity being different than the first polarity, wherein, to selectively wind the winding in the first direction, the winding is wound around the winding support structure and the wire redirection structure, and wherein, to selectively wind the winding in the second direction, the winding is wound around the winding support structure and not wound around the wire redirection structure;
    wherein the wire redirection structure includes a first post and second post, and wherein, to selectively wind the winding in the first direction, the winding is wound on the first post, the winding support structure, and the second post;
    wherein the field core includes a first terminal assembly supported by the terminal plate and a second terminal assembly supported by the terminal plate, the winding having a first lead a second lead, and an intermediate portion between the first lead and the second lead, wherein, in the one of the first direction and second direction, the first lead is connected to the first terminal assembly, the intermediate portion is wound around the first post, the winding support structure, and the second post, and the second lead is connected to the second terminal assembly.

7. A field assembly as claimed in claim 6, wherein the wire redirection structure, a portion of the first terminal assembly, and a portion of the second terminal assembly are formed on a terminal plate.

8. A field assembly as claimed in claim 6, wherein the field core has a first end and a second end, and wherein the terminal plate is connected to the first end of the field core such that the wire redirection structure, the first terminal and the second terminal assembly are positioned on the first end of the field core.

9. A field assembly for an electric motor, the field assembly comprising:
    a field core having a first end and a second end, the field core including a winding support structure, a first terminal assembly, and a second terminal assembly;
    a terminal plate connected to the first end of the field core, the terminal plate supporting the first terminal assembly and the second terminal assembly;
    a wire redirection structure supported on the field core; and
    a winding selectively wound on the field core in one of a first direction, to provide a first polarity, and a second direction, to provide a second polarity, the second polarity being different than the first polarity, in one of the first direction and the second direction, the winding being wound on the winding support structure and the wire redirection structure, in the other of the first direction and the second direction, the winding being wound on the winding support structure and not being wound on the wire redirection structure;
    wherein the winding has a first lead, a second lead, and an intermediate portion between the first and second lead, wherein, to selectively wind the winding in the first direction, the first lead is connected to the first terminal assembly, the intermediate portion is wound around the winding support structure, and the second lead is connected to the second terminal assembly.

10. A field assembly as claimed in claim 9, wherein the terminal plate is formed of an insulated material.

11. A field assembly as claimed in claim 10, wherein the wire redirection structure includes a first post and a second post, wherein in the one of the first direction and the second direction, the winding is wound on the winding support structure, the first post and the second post.

12. A field assembly as claimed in claim 11, wherein, to selectively wind the winding in the second direction, the first lead is connected to the first terminal assembly, the intermediate portion is wound around the first post, the winding support structure, and the second post, and the second lead is connected to the second terminal assembly.

13. A field assembly as claimed in claim 10, wherein, to selectively wind the winding in the first direction, the winding is not wound on the wire redirection structure.

14. A field assembly as claimed in claim 2, and further comprising a first terminal assembly supported by the terminal plate and a second terminal assembly supported by the terminal plate, wherein the winding includes a first lead, a second lead, and an intermediate portion, wherein, to selectively wind the winding in the first direction, the first lead is connected to the first terminal assembly, the intermediate portion is wound around the winding support structure and the wire redirection structure, and the second lead is connected to the second terminal, and wherein, to selectively wind the winding in the second direction, the first lead is connected to the first terminal assembly, the intermediate portion is wound around the winding support structure and not wound around the wire redirection structure, and the second lead is connected to the second terminal.

15. A field assembly as claimed in claim 1, wherein the first direction is one of a generally clockwise direction and generally counterclockwise direction, and wherein the second direction is the other of the generally clockwise direction and generally counterclockwise direction.

16. A field assembly as claimed in claim 10, wherein the first direction is one of a generally clockwise direction and a generally counterclockwise direction, and wherein the second direction is the other of the generally clockwise direction and generally counterclockwise direction.

* * * * *